United States Patent [19]

Brännström et al.

[11] Patent Number: 5,702,112
[45] Date of Patent: Dec. 30, 1997

[54] TOOL LOCKING APPARATUS FOR MACHINE HAMMERS

[75] Inventors: Östen Kurt Brännström, Saltsjö-Boo; Stig Bertil Artur Fredin, Haninge, both of Sweden

[73] Assignee: Atlas Copco Berema Aktiebolag, Nacka, Sweden

[21] Appl. No.: 454,237

[22] PCT Filed: Dec. 14, 1993

[86] PCT No.: PCT/SE93/01066

§ 371 Date: Jun. 13, 1995

§ 102(e) Date: Jun. 13, 1995

[87] PCT Pub. No.: WO94/14580

PCT Pub. Date: Jul. 7, 1994

[30] Foreign Application Priority Data

Dec. 18, 1992 [SE] Sweden ............... 9203823

[51] Int. Cl.$^6$ ............................................. B25D 17/08
[52] U.S. Cl. .......................... 279/19; 279/19.5; 279/97; 403/318; 403/355
[58] Field of Search .................. 279/19, 19.5, 76, 279/97; 403/315–319, 355

[56] References Cited

U.S. PATENT DOCUMENTS

| | | | |
|---|---|---|---|
| 1,049,984 | 1/1913 | Bowers | 403/318 |
| 2,279,960 | 4/1942 | Terry | 279/19.5 |
| 2,935,327 | 5/1960 | Lear | 279/19.5 |
| 3,997,989 | 12/1976 | Stepe | 279/97 |
| 4,096,653 | 6/1978 | Kaarlela et al. | 403/318 |

FOREIGN PATENT DOCUMENTS

| | | | |
|---|---|---|---|
| 2 234 967 | 1/1975 | France . | |
| 2353679 | 6/1974 | Germany | 279/97 |
| 444 280 | 4/1986 | Sweden . | |
| 1232472 | 5/1986 | U.S.S.R. | 279/19 |

OTHER PUBLICATIONS

Derwent Abstract, No. 91–236082/32, week 9132, Abstract of SU 1592482 (AS Sibe Mining Inst), 15 Sep. 1990.

Primary Examiner—Steven C. Bishop
Attorney, Agent, or Firm—Frishauf, Holtz, Goodman, Langer & Chick

[57] ABSTRACT

In the front head (11) of a machine hammer (10), transversely disposed wedges (18) are adapted to lock the working tool (12) so that the working tool (12) is axially movable by form-restricted cooperation with recesses (16) on the working tool (12). Each wedge (18) is locked in the front head (11) by a key (20), which extends across the wedge (18) into engagement with a transverse bore (21) therein. The key (20) has a releasable locking device including a locking element affixed in the front head (11) and formed by a polyurethane block (24). The block (24) is provided with a through bore (27) and has elastically form-recovering material properties. When, for purposes of locking the key (20), the key (20) is pressed through the bore of the block (24), the block (24) is caused to expand resiliently into an annular groove (22) on the key (20), thereby locking the key (20) in the front head (11) and providing its wedge (18) locking function. In use of two wedges (18), one single key (20) is set to lock both wedges (18) and is locked by one single block (24).

23 Claims, 1 Drawing Sheet

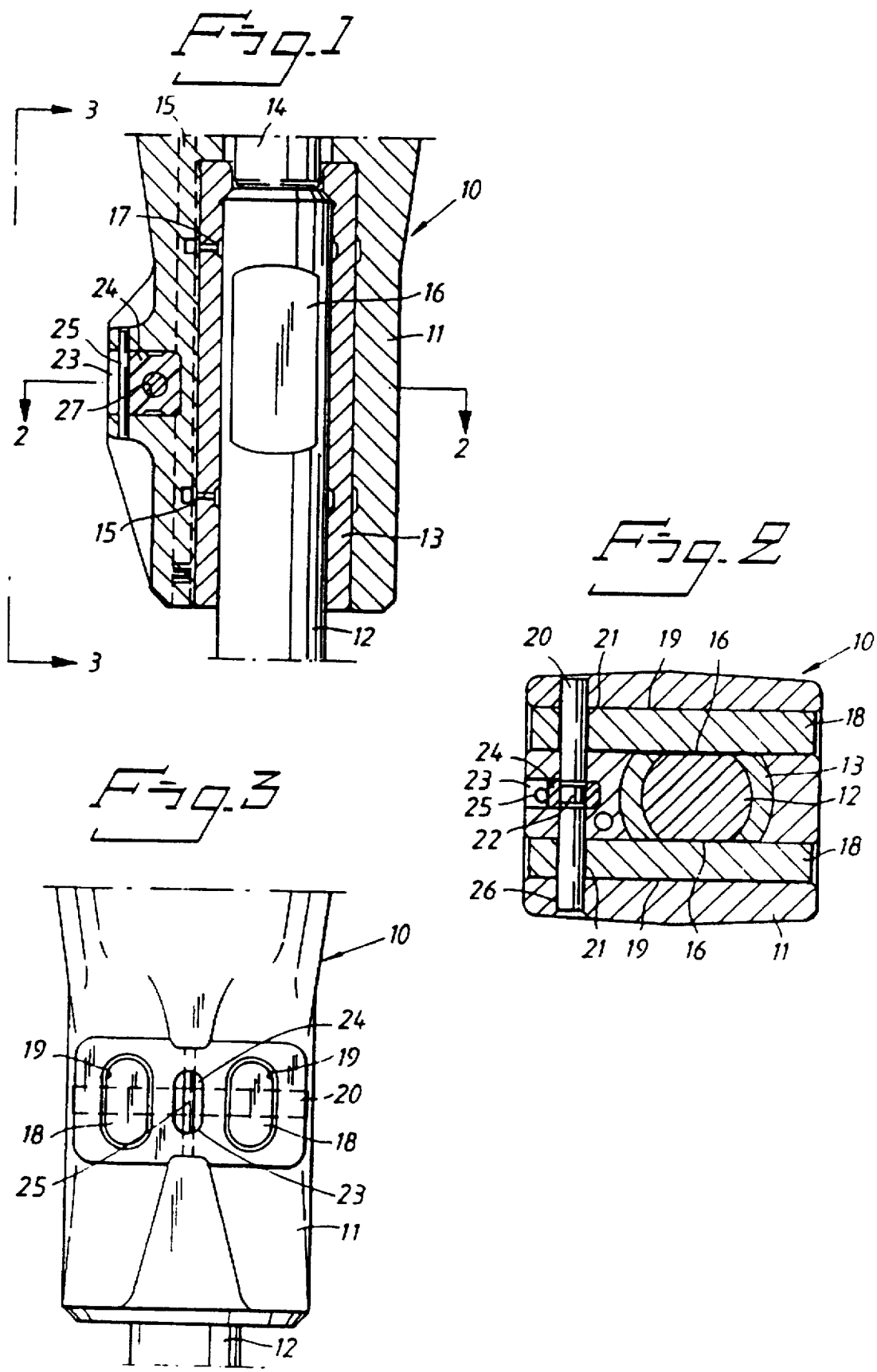

TOOL LOCKING APPARATUS FOR MACHINE HAMMERS

BACKGROUND OF THE DISCLOSURE

The present invention relates to a tool locking apparatus for machine hammers of the type having a front head with an impact delivering working tool carried axially movably therein, at least one wedge disposed transversely in the front head and insertable into form-restricted engagement with a side recess in the working tool in order to limit the axial movability of and lock the working tool relative to the front head, and a key axially insertable transversely into the front head to extend across the the wedge and retain the wedge in a position locking the working tool.

In this predominantly heavy type of machinery, the demands concerning safe locking of the working tool in the machine housing are very high. A tool which falls out, for instance when penetrating a concrete vault, can cause considerable material damage, and above all, can lead to serious personal injury. In larger mostly hydraulically driven types of machine hammers, it is not unusual that the weight of the working tool reaches 130 kg, which underlines the danger. Simultaneously there is also the demand that changes between different types of tools, for example breaking tools, chisels, spades and rams, under active field service conditions can be made as quickly as possible.

In earlier constructions applicant has himself made use of spring loaded pins for locking the wedges. Wear study indicates, that impact waves during work of the machine hammer via the wedges are transmitted to the pins, tend to urge them into an oblique position due to their short guiding length, and lead to increased wear. Worn wedges and damaged pins can be replaced by exchange, while wear of the machine housing affects a main component which cannot be looked at as a spare part. Furthermore, there is the risk of broken springs endangering safe locking of the wedges. An alternative earlier suggestion known to applicant, which consisted in locking the wedges by engagement with spring loaded sleeves, was in the long run similarly liable to wear and fatigue of the springs.

In the type of machine hammers stated by way of introduction above, and in particular concerning heavy, preferably hydraulically driven machines to be mounted on booms of mobile working machinery, the object of the present invention is to create a locking means able to offer increased safety against the tool falling out from the machine during operation, and to allow easier handling when changing the tool under field conditions. These objects are achieved by the apparatus defined in the claims appended hereto.

BRIEF DESCRIPTION OF THE DRAWINGS

The invention will be described in more detail hereinafter with reference to the accompanying drawing. FIG. 1 of the drawing shows a partial longitudinal section through the forward portion of a machine hammer embodying the invention. FIG. 2 shows a cross section on the line 2—2 in FIG. 1. FIG. 3 is a side view of the front head viewed in the direction of arrows 3—3 in FIG. 1.

DETAILED DESCRIPTION

The machine hammer 10 in FIG. 1 carries a front head 11 in which a working tool 12, for example a breaking tool, is axially movably guided in a tool sleeve 13, suitably made of steel and strongly press fitted in the front head 11. When starting the machine, the movability of the working tool 12 is supported by lubricating grease, portion-wise supplied via ring grooves and lubricating passages 15, 17 to the interior of the tool sleeve 13. In a conventional way, not illustrated in FIG. 1, a suitably hydraulically driven reciprocating hammer piston 14 delivers impact energy to the working tool 12. Diametrically opposed side recesses 16 are provided in the working tool 12 and wedges 18, carried in the front head 11, extend transversely to the working tool 12 into the recesses 16 which by form-bound engagement at their opposite ends are adapted to limit the axial movement of the working tool 12, thereby retaining the tool 12 in the front head 11 and hindering it from falling out. In the present instance the wedges 18, as usual in case of heavier machines, are formed with an oblong cross-section and parallel semi-cylindrical shorter sides. In smaller machines circularly cylindrical wedges may be used as well.

The front piece 11 comprises a pair of parallel bores or oval channels 19 into which the wedges 18 can be pushed axially in order to lock the working tool 12. A side bore 26 is formed in the front head 11, which centrally intersects and and crosses the channels 19, and a key 20 is insertable thereinto and led through aligned cross-bores 21 in the wedges 18. In case of circularly cylindrical wedges 18, such wedges should be turned to bring the cross-bores 21 into alignment with the side bore 26. The key 20 locks the wedges 18 in working position in the front head 11.

The key 20, however, has a tendency to to be shaken out of the side 26 bore during impacting work, and must be locked in the front head 11 by an arresting element allowing safe looking and concurrent simple and quick release of such locking. To this end the key 20, according to the invention, is looked in an improved way, form-bound in the front head 11 by releasable engagement with a locking element made of a material having elastically form-recovering property, suitably of plastic material and preferably of polyurethane. The form-bound engagement can be achieved by a locking element disposed sidewise adjacent to the the key 20 in the front head 11 which by a tongue is laterally engageable with a ring groove in the key 20 (not shown in the drawing). A safer way of locking, however, can be achieved if the locking element is formed as a die-like block 24 of polyurethane with a central through bore 27 of a somewhat smaller diameter than the diameter of the key 20. The block 24 is inserted in a milled slot 23 in the front head 11 and can be locked therein by a locking pin 25, for example in the form of a hollow slit spring sleeve. The slot 23 intersects the side bore 26 of the key 20 and in locking position the bore 27 of the block 24 is disposed coaxially with the side bore 26. The key 20 has an annular waist-groove 22 with a reduced diameter in comparison with the remainder of key 20 and corresponding to the inner diameter of the block 24.

With the wedges 18 in place in working position as in FIG. 2, and inserted to place the cross-bores 21 in substantially coaxial relation to the side bore 26, the key 20 is set thereinto and pressed through the bore 27 of the locking element or block 24 until the latter snaps into the waist-groove 22 and locks the key 20. When disassembling the wedges 18 in order to change the tool, the key 20 is first pressed out from the block 24 and the side bore 26 so that the wedges 18 then readily can be removed.

In machine hammers of lesser power, when a one-sided locking of the working tool 12 by a single wedge 18 will suffice, or if, as an alternative to the construction shown in FIG. 2, there is desired to allot a key 20 to each of wedges 18, it will be evident, that a locking element similar to the block 24 affixed in the front head 11 would have to be allotted to the key 20 at hand, or to each of the two keys 20, in which cases key-locking will achieved by form-bound cooperation with a ring-groove arranged in suitable position on each key.

Furthermore, at lesser power, it may be sufficient to lay the key 20 across an outer notch on a coacting wedge 18 instead of mating the key 20 with a through bore 21 in the wedge 18.

We claim:

1. A tool locking apparatus for machine hammers (10) having a front head (11) with an impact delivering working tool (12) carried axially movably therein, the apparatus further comprising:

at least one wedge (18) disposed transversely in the front head (11) and insertable into form-restricted engagement with a side recess (16) in the working tool (12) in order to limit the axial movability of and lock the working tool (12) relative to the front head (11), and a key (20) axially insertable transversely into the front head to extend across the wedge (18) and retain the wedge (18) in a position that locks the working tool (12), wherein the key (20) is locked in the front head (11) by releasable form-bound engagement with a locking element (24) of a material having elastically form-recovering properties.

2. A tool locking apparatus according to claim 1, wherein the locking element comprises a block (24) of plastic material having said resiliently form-recovering properties, said block (24) being provided with a through bore (27) to be penetrated by the key (20) when the key (20) is inserted into the front head (11) crosswise relative to the wedge (18), the locking element (24) thus being forcibly expanded around the key (20) and recovering resiliently to a locking position around and into an annular groove (22) provided on the key (20).

3. A tool locking apparatus according to claim 1, wherein the locking element (24) comprises a block (24) of polyurethane.

4. A tool locking apparatus according to claim 2, wherein the key (20) is adapted to secure two said wedges (18) provided at opposite sides of the working tool (12), the key (20) crossing the wedges (18) by extending through coaxially alignable openings (21) in the wedges (18).

5. A tool locking apparatus according to claim 4, wherein the locking element block (24) is affixed in a slot (23) in the front head (11) with its bore (27) disposed in a position in respect to which the openings (21) of the wedges (18) can be oriented coaxially.

6. A tool locking apparatus according to claim 5, wherein said locking element block (24) is arranged intermediate the wedges (18) in the front head (11) and by its bore (27) cooperates with said annular groove (22) in the key (20).

7. A tool locking apparatus according to claim 2, wherein:

the front head (11) comprises first and second mutually parallel channels (19) for insertion of one said wedge (18) into each of said channels, the front head (11) has a side bore (26) for the key (20), which side bore (26) intersects the channels (19), transverse through bores (21) are provided in the wedges (18) and are equal in size and alignable with the side bore (26) in the front head (11), and the locking element (24) is provided in the front head (11) with the bore (27) of the locking element (24) in coaxial relation to the side bore (26) for the key (20).

8. A tool locking apparatus according to claim 2, wherein:

the front head (11) comprises a first channel (19) for the insertion of a wedge (18) and has a side bore (26) for the key (20) that intersects the channel (19), a transverse through bore (21) is provided in the wedge (18) and is equal in size and alignable with the side bore (26) in the front head (11), and the locking element (24) is provided in the front head (11) with the bore (27) of the locking element (24) in coaxial relation to the side bore (26) for the key (20).

9. A tool locking apparatus according to claim 2, wherein the locking element (24) comprises a block (24) of polyurethane.

10. A tool locking apparatus according to claim 1, wherein the key (20) is adapted to secure two said wedges (18) provided at opposite sides of the working tool (12), the key (20) crossing the wedges (18) by extending through coaxially alignable openings (21) in the wedges (18).

11. A tool locking apparatus according to claim 3, wherein the key (20) is adapted to secure two said wedges (18) provided at opposite sides of the working tool (12), the key (20) crossing the wedges (18) by extending through coaxially alignable openings (21) in the wedges.

12. A tool locking apparatus according to claim 9, wherein the key (20) is adapted to secure two said wedges (18) provided at opposite sides of the working tool (12), the key (20) crossing the wedges (18) by extending through coaxially alignable openings (21) in the wedges (18).

13. A tool locking apparatus according to claim 12, wherein the locking element block (24) is affixed in a slot (23) in the front head (11) with its bore (27) disposed in a position in respect to which the openings (21) of the wedges (18) can be oriented coaxially.

14. A tool locking apparatus according to claim 16, wherein said locking element block (24) is arranged intermediate the wedges (18) in the front head (11) and by its bore (27) cooperates with said annular groove (22) in the key (20).

15. A tool locking apparatus according to claim 7, wherein the locking element (24) comprises a block (24) of polyurethane.

16. A tool locking apparatus according to claim 8, wherein the locking element (24) comprises a block (24) of polyurethane.

17. A tool locking apparatus according to claim 4, wherein said coaxially alignable openings comprise cross-bores (21) in the wedges (18).

18. A tool locking apparatus according to claim 5, wherein said coaxially alignable openings comprise cross-bores (21) in the wedges (18).

19. A tool locking apparatus according to claim 6, wherein said coaxially alignable openings comprise cross-bores (21) in the wedges (18).

20. A tool locking apparatus according to claim 10, wherein said coaxially alignable openings comprise cross-bores (21) in the wedges (18).

21. A tool locking apparatus according to claim 11, wherein said coaxially alignable openings comprise cross-bores (11) in the wedges (18).

22. A tool locking apparatus according to claim 12, wherein said coaxially alignable openings comprise cross-bores (21) in the wedges (18).

23. A tool locking apparatus according to claim 13, wherein said coaxially alignable openings comprise cross-bores (21) in the wedges (18).

* * * * *

UNITED STATES PATENT AND TRADEMARK OFFICE
CERTIFICATE OF CORRECTION

PATENT NO. : 5,702,112
DATED : December 30, 1997
INVENTOR(S) : Osten K. BRANNSTROM et al.

It is certified that error appears in the above-identified patent and that said Letters Patent is hereby corrected as shown below:

Column 4, line 34 (claim 14, line 1), change "claim 16"
to --claim 13--;

Column 4, line 59 (claim 21, line 3), change "bores (11)"
to --bores (21)--.

Signed and Sealed this

Twentieth Day of June, 2000

Attest:

Q. TODD DICKINSON

*Attesting Officer*  *Director of Patents and Trademarks*